US007357052B2

(12) United States Patent
Denne

(10) Patent No.: US 7,357,052 B2
(45) Date of Patent: Apr. 15, 2008

(54) ZIRCONIA BASED BLADES AND FOILS FOR RAZORS AND A METHOD FOR PRODUCING SAME

(75) Inventor: William Anthony Denne, Great Shelford (GB)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 10/528,767

(22) PCT Filed: Oct. 1, 2003

(86) PCT No.: PCT/US03/30958

§ 371 (c)(1), (2), (4) Date: Sep. 19, 2005

(87) PCT Pub. No.: WO2004/030875

PCT Pub. Date: Apr. 15, 2004

(65) Prior Publication Data

US 2006/0144193 A1 Jul. 6, 2006

(30) Foreign Application Priority Data

| | | | |
|---|---|---|---|
| Oct. 1, 2002 | (GB) | ................................ | 0222712.2 |
| Oct. 10, 2002 | (GB) | ................................ | 0223567.9 |
| Oct. 15, 2002 | (GB) | ................................ | 0223882.2 |

(51) Int. Cl.

| | |
|---|---|
| ***B23D 63/00*** | (2006.01) |
| ***B26B 21/54*** | (2006.01) |
| ***B26B 9/00*** | (2006.01) |
| *B21K 11/00* | (2006.01) |

(52) U.S. Cl. ................ 76/104.1; 30/346.54; 30/346.55

(58) Field of Classification Search ............... 76/104.1; 30/346.54, 346.53, 346.55, 346.58, 346.61, 30/350, 356

See application file for complete search history.

(56) References Cited

U.S. PATENT DOCUMENTS

| | | | |
|---|---|---|---|
| 2,989,804 | A | 6/1961 | Yellon |
| 3,870,776 | A | 3/1975 | McMahon |
| 4,105,493 | A | 8/1978 | Chauvy et al. |

(Continued)

FOREIGN PATENT DOCUMENTS

| | | |
|---|---|---|
| DE | 641901 C | 2/1937 |

(Continued)

OTHER PUBLICATIONS

European Search Report, Appl. No. 03759604, dated Aug. 2, 2006.

*Primary Examiner*—Joseph J. Hail, III
*Assistant Examiner*—Alvin J Grant
(74) *Attorney, Agent, or Firm*—Michaud-Duffy Group LLP

(57) ABSTRACT

Stabilized or partially stabilized zirconia paste may be screen printed onto hydrophilic plastic film in the form of a mesh. On firing, this becomes a very sharp foil for electric razors with excellent wear and flexibility characteristics. Stabilized or partially stabilized zirconia may also be screen printed onto a wettable plastic film then fired to produce low cost razor blades with an excellent edge. A curved razor blade incorporating an array of holes, each of which has a knife edge periphery, offers greater cutting power and control of the skin surface than a single or double edge.

14 Claims, 3 Drawing Sheets

U.S. PATENT DOCUMENTS

| | | | | |
|---|---|---|---|---|
| 4,483,068 | A | 11/1984 | Clifford et al. | |
| 4,552,832 | A | 11/1985 | Blume et al. | |
| 5,018,274 | A | 5/1991 | Trotta | |
| 5,604,983 | A | 2/1997 | Simms et al. | |
| 5,630,275 | A * | 5/1997 | Wexler | 30/50 |
| 5,750,956 | A | 5/1998 | Barnes et al. | |
| 5,857,260 | A * | 1/1999 | Yamada et al. | 30/346.51 |
| 6,296,910 | B1 * | 10/2001 | Choy et al. | 427/475 |
| 6,354,008 | B1 * | 3/2002 | Domoto et al. | 30/346.53 |
| 6,428,651 | B1 * | 8/2002 | Princell et al. | 156/259 |
| 6,540,760 | B2 * | 4/2003 | Austring et al. | 606/166 |
| 7,140,113 | B2 * | 11/2006 | King et al. | 30/346.54 |
| 2003/0063155 | A1 | 4/2003 | Nakao et al. | |

FOREIGN PATENT DOCUMENTS

| | | |
|---|---|---|
| FR | 2584333 A | 1/1987 |

* cited by examiner

ZIRCONIA BASED BLADES AND FOILS FOR RAZORS AND A METHOD FOR PRODUCING SAME

CROSS REFERENCE TO RELATED APPLICATIONS

This application is entitled to the benefit of and incorporates by reference essential subject matter disclosed in International Application No. PCT/US2003/030958 filed on Oct. 1, 2003 and British Provisional Application No. 0222712.2 filed on Oct. 1, 2002, British Provisional Application No. 0223567.9 filed on Oct. 10, 2002, and British Provisional Application No. 0223882.2 filed on Oct. 16, 2002, the disclosures of which are incorporated by reference herein in their entirety.

FIELD OF THE INVENTION

This invention relates generally to blades and foils for razors, and more particularly relates to zirconia based blades and foils for razors, as well as methods for producing same.

BACKGROUND OF THE INVENTION

Electric razors with cutting foils and wet shave razors with cutting blades have been in use for many decades. With respect to electric razors, they comprise a pierced foil and cutter. The foil is generally electroformed from nickel, which provides a very sharp edge but of limited hardness. Electric razor foils are generally made by electroforming nickel. This is a relatively expensive process and the hardness of the resulting nickel cutting edges is not that high.

With respect to wet shave razors, the razor blades traditionally have a straight cutting edge that extends the length of the razor head. Safety razors have guards to control the position of the skin with respect to the cutting edge, so that the cutting edge rides over the skin but cuts protruding hair. Such razor blades have traditionally been made from high quality carbon steel. The innovation of using stainless steel has been fraught with the difficulty of forming and holding an ultra sharp edge. Ground ceramic razor blades tend to have a ragged microstructure rather than rounded, and consequently dig into skin rather than sliding over it.

Accordingly, it is a general object of the present invention to provide zirconia based blades and foils, and methods of fabrication thereof, that overcome the above-identified drawbacks of prior razors.

SUMMARY OF THE INVENTION

The present invention resides in a method of fabricating a foil for an electric razor. A substrate is provided including a combustible surface. A foil plan form is generated on the combustible surface with a zirconia based ink such that flow of the ink under surface tension forces generates sharp edges to the foil. The foil plan form is fired to burn away the combustible surface such that zirconia forms a durable foil that maintains sharpness over repeated use. The zirconia based ink can include partially stabilized or fully stabilized zirconia. The printing of the foil plan form can be accomplished by either screen printing or vacuum forming. The combustible surface can include, for example, a plastic film of high surface finish, and is preferably hydrophilic.

The present invention also resides in a method of fabricating a blade for a wet shave razor. A substrate is provided including a combustible surface. A zirconia based ink is generated on the combustible surface such that the ink wets the substrate and edges of the ink slightly to form a plurality of sharply pointed meniscus to serve as cutting surfaces. The ink is fired to burn away the combustible surface and to harden a rounded, sharp edge on the plurality of meniscus. Preferably, the sharp edges of the meniscus have an edge radius of about 50 nanometers or less.

The present invention further resides in a blade for a wet shave razor that is bidirectional and comprises a substrate curved along a direction of blade movement to conform to a contour of the skin of a user. The blade substrate defines a plurality of holes each having a periphery. A leading portion of the holes in the direction of blade movement serves as a guard, and a trailing portion of the holes serves as a cutting edge. Preferably, the substrate includes partially stabilized or fully stabilized zirconia. The holes are arranged in an array that can be either even or staggered. The shape of the holes can be, for example, rectangular or diamond-shaped.

DETAILED DESCRIPTION OF THE PREFERRED EMBODIMENTS

Figure 1A:
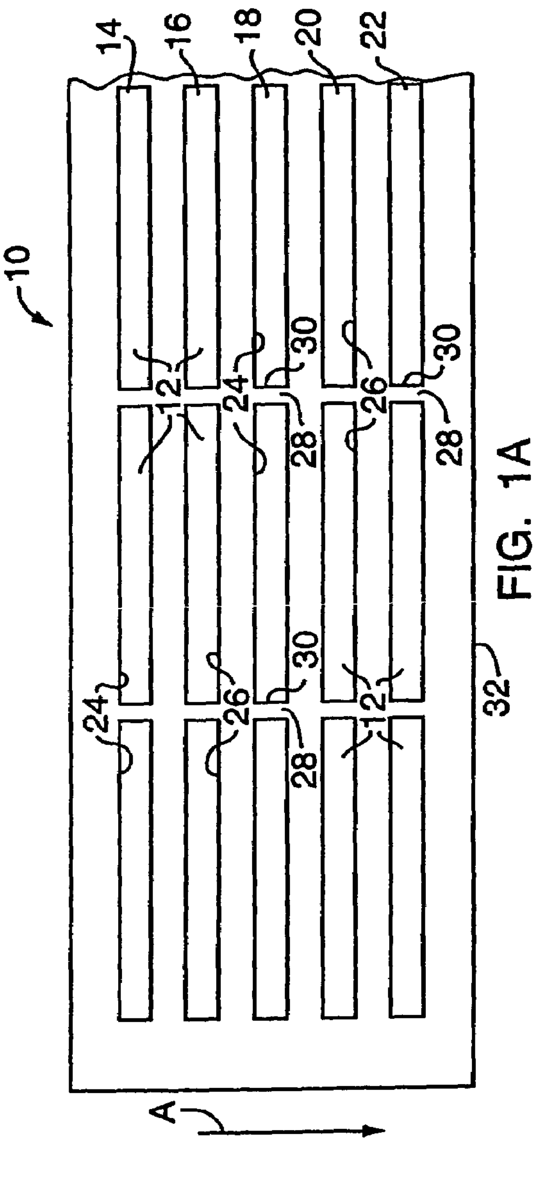
FIG. 1A is a top plan view of a razor blade substrate defining an array of rectangular slots serving as cutting edges in accordance with the present invention.

In accordance with the present invention, an electric razor foil can be made from zirconia ceramic. The zirconia may be partially or fully stabilized. The foil may be fabricated by screen printing the foil plan form onto a hydrophilic surface with a zirconia based ink, such that flow of the ink under surface tension forces generates very sharp edges to the ceramic foil. The planar hydrophilic surface may be combustible so that it vanishes during firing. The surface is preferably a plastic film of good surface finish. The foil network may be biaxially extensible to conform to the skin. The cutter may also be in the form of a zirconia foil. The zirconia print and plastic film may be formed prior to firing. Vacuum forming may be appropriate. Appropriate binders and plasticisers in the zirconia ink may stop cracking of the ceramic print during the forming process.

Partially stabilized zirconia has the hardness and toughness of tool steel. It has excellent wear characteristics and takes a very keen edge. While it is much more expensive, the quantity in a razor foil is minimal and it may be fabricated more cheaply than electroforming.

A razor foil pattern may be precisely screen printed onto a plastic film with a zirconia ink. If the film is slightly hydrophilic it may be arranged, by controlling the ink properties, such that the edges of the print may run slightly under the influence of surface tension forces to provide an extremely sharp edge. Even a low cost plastic film may have a surface finish approaching optical quality and the zirconia print will accurately reproduce this.

The printed plastic film may be fired in the conventional manner. The plastic will burn away at a low temperature and the zirconia will form a very thin foil of extreme toughness. It will maintain its sharpness for a long time.

The foil pattern can be printed in a manner that permits biaxial extension to follow the contours of the skin. A cutter in foil form can also be fabricated which will follow the outer foil and provide a flexible cutting surface.

The printed plastic may be vacuum formed if desired. This permits the forming of the profiled cutters used in current multi head shavers. The form may also be exploited to assist with maintaining dimensional stability during the firing process.

Further in accordance with the present invention, razor blades can be fabricated from a ceramic ink that is screen printed on a combustible surface and then fired. The ceramic is preferably stabilized or partially stabilized zirconia. The combustible surface is preferably a plastic film of high surface finish. The ink vehicle and combustible surface may be so chosen that the ink wets the combustible surface.

Stabilized zirconia forms exceptional cutting blades. It is extremely strong, tough and hard. In thin sheets it may be very pliable. It has been discovered to be an excellent medium for razor blade fabrication. The raw material is very expensive compared with steel and is expensive to diamond machine. Cutting edges in zirconia are conventionally created by diamond machining, but this process produces ragged edges on a micro-scale which tend to dig into skin rather than slide over it. This, of course, is disastrous in a razor blade.

Screen printing of ceramic inks is a well known mass production technique in hybrid electronics. This produces a thin film of very finely controlled thickness at very low cost. The ink comprises very finely powdered ceramic in a binder and solvent. It is possible to choose the composition of ink such that it wets the substrate and the edges of the print flow slightly to form a sharply pointed meniscus. On firing, the substrate may burn away and the meniscus will form a very sharp edge. The firing process causes the finely powdered grains to sinter into a solid mass. This process may be exploited to form an edge to the blade which is rounded on a microscale. With modern milling techniques, the powder particle size may be some tens of nanometers. It is therefore possible to organize the firing to produce a blade with an edge radius of about 50 nanometers or less.

The ceramic will take the surface finish of the substrate on the printed side, which may approach optical quality for many plastic films. If this is the side that faces the skin, a very smooth blade will result. Screen printing produces very thin layers with excellent reproducibility. Zirconia blades as thin as about 0.025 mm are feasible. By using thin blades of minimum width, blade costs of a fraction of a penny are feasible.

This fabrication technique offers the advantages of large scale mass coupled with low materials cost and no finishing processes.

Further in accordance with the present invention, a metallic or ceramic razor blade can be curved and define a plurality of holes or slots, some or all of which incorporate a cutting edge as part or all of their periphery. With reference to FIG. 1A, for example, a razor blade is indicated generally by the reference number 10. The blade 10 defines a plurality of holes or rectangular slots 12 that preferably form an array. As shown in FIG. 1A, the array of slots 12 includes five columns 14, 16, 18, 20 and 22. However, the array can include a fewer or greater number of columns than that illustrated without departing from the scope of the present invention. A portion of the periphery of the slots 12 serve as cutting edges that are well protected within the slots. As a result, the edge of the blade is no longer in need of careful protection.

With respect to the direction of blade movement during a shaving operation as indicated by the arrow A, the longer edges of the rectangular slots 12 are trailing edges 24 and leading edges 26. The blade 10 further defines interconnecting spokes 28 between shorter edges 30 of the rectangular slots 12 for enhancing the rigidity of the blade. A periphery 32 of the blade 10 may be used to retain the blade in a razor.

The leading edges 26 serve as a guard, and the trailing edges 24 serve as the cutting edge. However, the blade 10 can be used in a direction opposite to that indicated by the arrow A. When used in such opposite direction, the edges 24 are the leading edges serving as the guard, and the edges 26 are the trailing edges serving as the cutting edges.

Figure 1B:
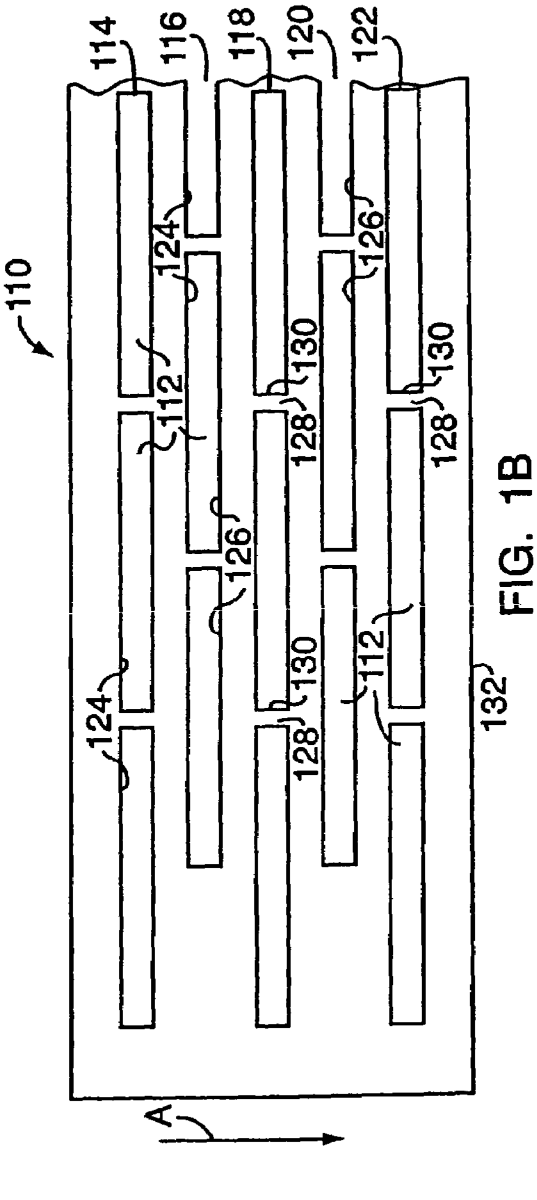
FIG. 1B is a top plan view of a razor blade substrate defining an array of staggered rectangular slots serving as cutting edges in accordance with another embodiment of the present invention.

Turning to FIG. 1B, a blade in accordance with another embodiment of the present invention is indicated generally by the reference number 110. Like elements with those shown in FIG. 1A are indicated by like reference numbers preceded by "1". The blade 110 defines a plurality of holes or staggered rectangular slots 112 that form an array. As shown in FIG. 1B, the array of slots 112 includes five columns 114, 116, 118, 120 and 122. The slots in adjacent columns are positioned in staggered relationship to one another to provide a consistent cutting surface along a direction of the blade transverse to that of the direction of movement.

Similar to the previous embodiment, a portion of the periphery of the slots 112 serve as cutting edges. With respect to the direction of blade movement during a shaving operation as indicated by the arrow A, the longer edges of the rectangular slots 112 are trailing edges 124 and leading edges 126. The blade 110 further defines interconnecting spokes 128 between shorter edges 130 of the rectangular slots 112 for enhancing the rigidity of the blade. A periphery 132 of the blade 110 may be used to retain the blade in a razor.

The leading edges 126 serve as a guard, and the trailing edges 124 serve as the cutting edge. However, the blade 110 can be used in a direction opposite to that indicated by the arrow A. When used in such opposite direction, the edges 124 are the leading edges serving as the guard, and the edges 126 are the trailing edges serving as the cutting edges.

Figure 1C:
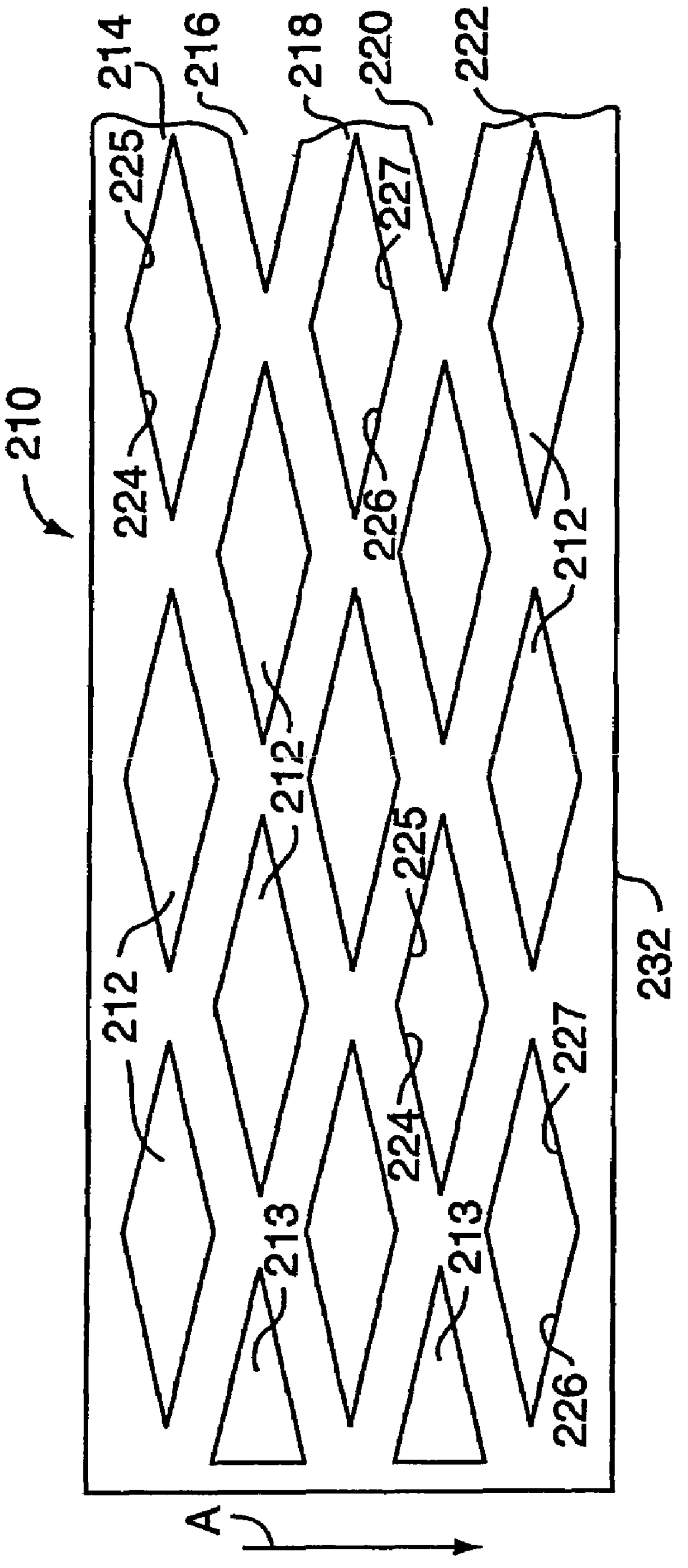
FIG. 1C is a top plan view of a razor blade substrate defining an array of diamond-shaped slots serving as cutting edges in accordance with a further embodiment of the present invention.

Turning to FIG. 1C, a blade in accordance with a further embodiment of the present invention is indicated generally by the reference number 210. Like elements with those shown in the previous embodiments are indicated by like reference numbers preceded by "2". The blade 210 defines a plurality of holes or staggered diamond-shaped slots 212 that form an array. The blade 210 also preferably defines partial or half-diamond-shaped slots 213 at ends of the array for even distribution of cutting surfaces between sides of the blade. As shown in FIG. 1C, the array of slots 212 includes five columns 214, 216, 218, 220 and 222. The slots in adjacent columns are positioned in staggered relationship to one another to provide a consistent cutting surface along a direction of the blade transverse to that of the direction of movement.

Similar to the previous embodiments, portions of the periphery of the slots 212 serve as cutting edges. With respect to the direction of blade movement during a shaving operation as indicated by the arrow A, the diamond-shaped slots 212 each include trailing edges 224, 225 and leading edges 226, 227. A periphery 232 of the blade 210 may be used to retain the blade in a razor.

The leading edges 226, 227 serve as a guard, and the trailing edges 224, 225 serve as the cutting edge. However, the blade 210 can be used in a direction opposite to that indicated by the arrow A. When used in such opposite direction, the edges 224, 225 are the leading edges serving as the guard, and the edges 226, 227 are the trailing edges serving as the cutting edges.

Figure 2:
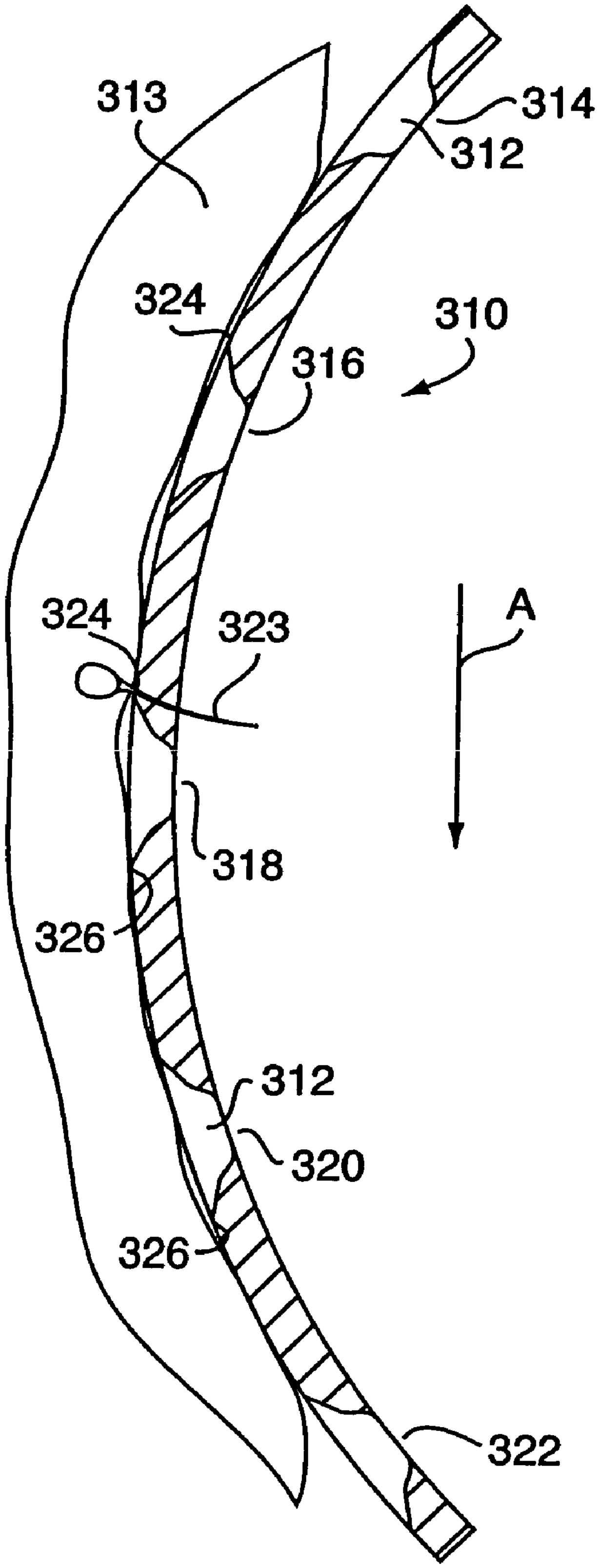
FIG. 2 is an elevational, cross-sectional view of the razor blade of FIG. 1 showing a curved contour of the blade in contact with the skin of a user.

With reference to FIG. 2, a blade in accordance with the present invention may have an overall curvature to expose different angles of blade to the skin. A curved blade 310 defines an array of holes or slots 312 in contact with skin 313 of a user during a shaving operation. As shown in FIG. 2, the array of slots 312 includes five columns 314, 316, 318, 320 and 322. With respect to the direction of blade movement during a shaving operation as indicated by the arrow A, a hair 323 is shown being cut by a trailing or cutting edge 324 of one of the holes 312. The curvature and flexibility of the blade 310 may be predetermined to offer the maximum ability to follow skin contours. Several cutting edges 324 may be in contact with the skin simultaneously. The leading edges 326 of the holes or slots 312 control the access of the skin 313 to the cutting edges 324 of the hole 312. The blade may be formed from metal by electroforming or by grinding away dimples in a planar shim. The blade may also be formed by screen printing ceramic ink as an array of holes, and then firing the print. The rheology of the ink may be arranged so that the flow of the periphery of the wet print may form a meniscus which becomes a polished razor edge on firing. The ceramic is preferably partially stabilized or fully stabilized zirconia ceramic. The ceramic may also be ground and polished after firing if desired.

Razor blades traditionally have a straight cutting edge. An array of holes 25 with cutting edges around their periphery in accordance with the present invention provides a longer cutting edge per square millimeter of blade and a tighter control of the angle at which the skin meets the blade. This results in a more rapid and closer shave with less chance of nicking the skin.

In a metal blade, such an array may be made by electroforming. Electroforming is relatively expensive for disposable blades, however, and nickel, which is the only practical metal for this technique, is not exceptionally hard. An alternative is to form an array of indentations in a planar metal shim, and then to grind away the raised bumps to create holes surrounded by a cutting edge.

A better process is to screen print the blade pattern with partially stabilized zirconia ink. If the rheology of the ink and the nature of the substrate are carefully chosen, the edges of the print flow to create a wetting meniscus. On firing, this meniscus naturally creates a polished razor edge.

As will be recognized by those of ordinary skill in the pertinent art, numerous modifications and substitutions may be made to the above-described embodiment of the present invention without departing from the scope of the invention. Accordingly, the preceding portion of this specification is to be taken in an illustrative, as opposed to a limiting sense.

What is claimed is:

1. A method of fabricating a foil for an electric razor, comprising the steps of:

providing a substrate including a combustible surface;

generating a foil plan form onto the combustible surface with a zirconia based ink such that flow of the ink under surface tension forces generates sharp edges to the foil; and firing the foil plan form to burn away the combustible surface such that zirconia forms a durable foil that maintains sharpness over repeated use.

2. A method as defined in claim 1, wherein the step of generating includes screen printing the foil plan form onto the combustible surface.

3. A method as defined in claim 1, wherein the step of generating includes vacuum forming the foil plan form onto the combustible surface.

4. A method as defined in claim 1, wherein the zirconia based ink includes partially stabilized zirconia.

5. A method as defined in claim 1, wherein the zirconia based ink includes filly stabilized zirconia.

6. A method as defined in claim 1, wherein the combustible surface is hydrophilic.

7. A method as defined in claim 1, wherein the combustible surface is a plastic film of high surface finish.

8. A method of fabricating a blade for a wet shave razor, comprising the steps of:

providing a substrate including a combustible surface;

generating a zirconia based ink onto the combustible surface such that the ink wets the substrate and edges of the surface slightly to form plurality of sharply pointed meniscus to serve as cutting surfaces; and firing the ink to burn away the combustible surface and to harden a rounded, sharp edge on the plurality of meniscus.

9. A method as defined in claim 8, wherein the step of generating includes screen printing the zirconia based ink onto the combustible surface.

10. A method as defined in claim 8, wherein the zirconia based ink includes partially stabilized zirconia.

11. A method as defined in claim 8, wherein the zirconia based ink includes fully stabilized zirconia.

12. A method as defined in claim 8, wherein the combustible surface is hydrophilic.

13. A method as defined in claim 8, wherein the combustible surface is a plastic film of high surface finish.

14. A method as defined in claim 8, wherein the sharp edges of the meniscus have an edge radius of about 50 nanometers or less.

* * * * *

UNITED STATES PATENT AND TRADEMARK OFFICE

CERTIFICATE OF CORRECTION

PATENT NO. : 7,357,052 B2
APPLICATION NO. : 10/528767
DATED : April 15, 2008
INVENTOR(S) : William Anthony Denne It is certified that error appears in the above-identified patent and that said Letters Patent is hereby corrected as shown below:

Col. 6, Ln. 23
Claim 5, Please delete the word “filly” and substitute --fully--.

Signed and Sealed this

First Day of July, 2008

JON W. DUDAS
*Director of the United States Patent and Trademark Office*